United States Patent
Smerczek (10) Patent No.: US 12,372,147 B2
(45) Date of Patent: Jul. 29, 2025

(54) DIFFERENTIAL CAGE

(71) Applicant: ZF Friedrichshafen AG, Friedrichshafen (DE)

(72) Inventor: Simon Smerczek, Fürstenstein (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/769,752

(22) Filed: Jul. 11, 2024

(65) Prior Publication Data

US 2025/0020198 A1 Jan. 16, 2025

(30) Foreign Application Priority Data

Jul. 14, 2023 (DE) .......................... 102023206707.2

(51) Int. Cl.
*F16H 48/40* (2012.01)
*F16H 48/38* (2012.01)

(52) U.S. Cl.
CPC ....... F16H 48/40 (2013.01); *F16H 2048/382* (2013.01)

(58) Field of Classification Search
CPC ............... F16H 48/40; F16H 2048/382; F16H 2048/385
See application file for complete search history.

(56) References Cited

U.S. PATENT DOCUMENTS

| | | | | |
|---|---|---|---|---|
| 4,125,026 A * | 11/1978 | Torii | ....................... | F16H 48/08 475/230 |
| 6,656,079 B2 * | 12/2003 | Eulenstein | .............. | F16H 48/08 475/248 |
| 7,465,247 B2 * | 12/2008 | Bock | ....................... | F16H 48/08 74/606 R |
| 8,015,899 B2 * | 9/2011 | Gianone | .............. | B23K 33/006 74/606 R |
| 9,458,919 B2 * | 10/2016 | Yanase | ..................... | F16H 48/40 |
| 10,465,785 B2 * | 11/2019 | Sudou | .................... | F16H 57/037 |
| 10,539,216 B2 * | 1/2020 | Shirakawa | .............. | F16H 48/40 |
| 10,591,040 B2 * | 3/2020 | Yanase | .................... | F16H 48/40 |
| 2018/0142771 A1 * | 5/2018 | Zhang | .................... | B23K 26/32 |
| 2018/0306300 A1 * | 10/2018 | Rothstein | ................. | B23K 9/23 |

FOREIGN PATENT DOCUMENTS

| | | | | |
|---|---|---|---|---|
| CN | 112728035 A | * | 4/2021 | ............. F16H 48/08 |
| DE | 102008057370 A1 | * | 5/2010 | ............. F16H 48/08 |
| DE | 102009045424 A1 | * | 4/2011 | ............. F16H 48/08 |
| EP | 1248922 B1 | | 8/2004 | |

* cited by examiner

*Primary Examiner* — Sherry L Estremsky
(74) *Attorney, Agent, or Firm* — Dority & Manning, P.A.

(57) ABSTRACT

A differential cage (10) may accommodate a differential gear. The differential cage (10) has, on a radially outward side, a lateral surface (13), against which a gear wheel of the differential is to rest. The gear wheel is slidable on from a slide-on side and attached on the differential cage. The differential cage (10) includes a radially outwardly projecting flange (14) located axially on a side of the lateral surface (13) remote from the slide-on side. For the differential cage (10) to be welded to different types of gear wheels, a first abutment surface (17) and a second abutment surface (18) are formed on the flange (14) as alternatives for forming a weld joint with the gear wheel. The first abutment surface (17) is formed on the flange (14) facing radially outwards, and the second abutment surface (18) is formed on the flange (14) facing axially towards the slide-on side (15).

12 Claims, 5 Drawing Sheets

DIFFERENTIAL CAGE

CROSS-REFERENCE TO RELATED APPLICATION

The present application is related and has right of priority to German Patent Application No. DE 102023206707.2 filed on Jul. 14, 2023, which is incorporated by reference in its entireties for all purposes.

TECHNICAL FIELD

The invention relates generally to a differential cage. The invention further relates generally to a differential having an aforementioned differential cage.

BACKGROUND

Differentials are used to split an input torque, which has been input on the input side, onto two output sides and thus to permit rotational speed differences between the output sides. A differential usually has a differential cage, in which at least one differential gear is rotatably mounted. The at least one differential gear is then meshed with output gears on the output sides. Due to the tooth engagements, the input torque is split onto the two output sides. The at least one differential gear can compensate for rotational speed differences between the output sides by rotating in the differential cage. An input-side coupling is usually implemented at the differential cage via a gear wheel, which is usually in the form of a ring gear and is often welded to the differential cage.

EP 1 248 922 B1 describes a differential in which a gear wheel in the form of a ring gear is welded to a differential cage. The differential cage is provided on a radially outward side with a lateral surface, which forms a hub, onto which the ring gear can be placed. In addition, a circumferential flange is formed on the differential cage. The circumferential flange projects in a radially outward direction and has a radially outwards facing, circumferential contact surface. When the differential is assembled, the ring gear is slid from the slide-on side onto the differential cage, the ring gear being guided on the lateral surface and on the contact surface of the flange. An axial position of the ring gear with respect to the differential cage can be freely selected within the possible guide region. Once a desired axial position has been set, the differential cage and the ring gear can be welded to each other.

BRIEF SUMMARY

Example aspects of the present invention is that of providing a differential cage for a differential, wherein this differential cage is to be universally suitable to be welded to different types of gear wheels in order to reduce the manufacturing effort.

According to example aspect of the invention, a differential cage is provided for accommodating at least one differential gear of a differential gear set of a differential. In addition, the differential cage has, on a radially outward side, a lateral surface, against which a gear wheel of the differential is to rest, which gear wheel is to be slid on from a slide-on side and attached on the differential cage. The differential cage is also equipped with a radially outwardly projecting flange, which is located axially on a side of the lateral surface remote from the slide-on side.

The differential cage according to example aspects of the invention is therefore provided for use in a differential. In the differential, the differential cage is used for accommodating and, in particular, for rotatably mounting at least one differential gear of a differential gear set of the differential. Preferably, the differential cage defines an interior space in which the differential gear set is accommodated when the differential cage is installed and in which the at least one differential gear is rotatably mounted in the differential cage. In particular, the differential cage can have a pot- or basket-like shape for this purpose.

The differential cage is equipped on a radially outward side with a lateral surface, against which the gear wheel to be attached on the differential cage rests once the gear wheel has been attached. This lateral surface is formed, in particular circumferentially, on the differential cage and is preferably formed by a cylindrical portion of the differential cage. In addition, axially next to the lateral surface, the differential cage has a flange, which projects in a radially outward direction. Most particularly preferably, the flange projects from the differential cage farther in a radially outward direction in comparison to the lateral surface. In addition, the flange is formed, in particular circumferentially, on the differential cage.

The gear wheel to be attached on the differential cage is slid onto the differential cage from a slide-on side. The flange is provided axially, with respect to the lateral surface, on a side remote from the slide-on side. The gear wheel to be attached is, in particular, a ring gear.

"Axial" means, as set forth in the invention, an orientation parallel to a rotation axis of the differential cage, while "radial" means an extension in the diameter direction with the rotation axis as the center.

Example aspects of the invention encompass the technical teaching that a first abutment surface and a second abutment surface are formed on the flange, the first and the second abutment surfaces being provided as alternatives for forming a weld joint in each case with the gear wheel to be attached, in order to establish a weld connection. The first abutment surface is formed on the flange facing radially outwards, while the second abutment surface is formed on the flange facing axially in the direction of the slide-on side. In other words, the flange of the differential cage is therefore provided with two abutment surfaces, which are provided to form alternative attachment points of the gear wheel on the differential cage such that a weld joint with the gear wheel to be attached is formed on each of the two abutment surfaces and thus a weld connection can be established in each case. The first abutment surface on the flange faces radially outwards such that a weld joint with the gear wheel to be attached is to be formed on the first abutment surface in a radial direction. The second abutment surface on the flange faces axially in the direction of the slide-on side, as a result of which a weld joint with the gear wheel to be attached is to be formed on the second abutment surface in an axial direction.

Such an example embodiment of a differential cage has the advantage that, due to the two abutment surfaces formed on the flange, the differential cage can be easily used as an identical part for the welding to different variants of a gear wheel to be attached. This is the case because, due to the first abutment surface facing radially outwards and the second abutment surface facing axially in the direction of the slide-on side, gear wheels having different dimensions and/or attachment regions can each be easily welded to the differential cage. Consequently, the manufacturing effort can be reduced, since the differential cage according to example aspects of the invention can therefore be used as an identical part in the production of differently designed differentials, namely with different gear wheels which are to be attached to the differential cage.

The first abutment surface is formed on the flange facing radially outwards. Particularly preferably, the first abutment surface forms a radially outer boundary of the flange, i.e., is the radially outermost portion of the flange. When the flange is formed circumferentially, the first abutment surface is also formed, in particular, circumferentially.

The second abutment surface on the flange faces axially in the direction of the slide-on side. If the flange is formed circumferentially, the second abutment surface is also preferably formed circumferentially. Since the flange projects from the differential cage in a radially outward direction, the second abutment surface is designed, in particular, essentially as an annular surface.

According to example aspects of the invention, the two abutment surfaces are each designed to form a weld joint with the gear wheel to be attached, in order to be able to produce, at the particular weld joint, a weld connection of the differential cage with the gear wheel to be attached. In forming the weld joint between the flange and the gear wheel to be attached, a joint is formed, into which a weld can be introduced in order to connect the two parts by welding. The first abutment surface and the second abutment surface form alternative surfaces for forming a weld joint, i.e., the weld joint is produced either on the first abutment surface or on the second abutment surface in order to weld the differential cage to the gear wheel to be attached thereto. When the first abutment surface is used, the joint is formed radially between the differential cage and the gear wheel. When the second abutment surface is used, the joint extends axially between the differential cage and the gear wheel.

According to one example embodiment of the invention, a groove face, which faces axially in an opposite direction to the slide-on side, is formed on the first abutment surface. In this case, the first abutment surface is therefore not formed on a consistent outer diameter. Instead, the flange has a changing outer diameter in the region of the first abutment surface, as a result of which the groove face is defined. This has the advantage that, as a result, a certain surface formation can be obtained on the first abutment surface in order to achieve a certain weld during welding. Depending on whether the groove face is to extend over the entire axial extension of the first abutment surface or only over an axial portion of the first abutment surface, the flange is either provided with a changing outer diameter in the entire region of the first abutment surface or has a changing outer diameter on one portion and a constant outer diameter on another portion.

Depending on which weld shape on the part of the first abutment surface is to be obtained during welding, the groove face of the first abutment surface can be configured as a bevel, as a result of which a half V- or Y-groove can be formed, for example, on the part of the differential cage, or formed as a rounding such that, for example, a half U-groove is implementable.

Alternatively or additionally, in one example design option of the invention, a groove face which faces radially outwards is formed on the second abutment surface. As a result, a certain surface formation can also be achieved on the second abutment surface via the configured groove face and thus a certain weld can be obtained during welding. The groove face could extend over the entire radial extension of the second abutment surface or only over a radial portion of the second abutment surface. The former is achieved preferably by tapering the flange over the entire region of the second abutment surface, while, in the latter case, the flange is tapered, in particular, only over the appropriate radial portion of the second abutment surface.

The groove face of the second abutment surface can be formed as a bevel in order to obtain, for example, the shape of a half V- or Y-groove on the part of the differential cage during welding. Alternatively, the groove face of the second abutment surface could also be in the form of a rounding in order to obtain a weld in the sense of a half U-groove on the part of the differential cage after welding.

In one example development of the invention, the first abutment surface and the second abutment surface on the flange are separated from each other by an edge. In this case, the first abutment surface and the second abutment surface on the flange are therefore directly adjacent to each other. If the first abutment surface and the second abutment surface are formed circumferentially, the edge is also formed circumferentially.

In another example embodiment of the invention, the second abutment surface is delimited in a radially inward direction by a relief groove. This is combined, in particular, with the preceding example variant such that the second abutment surface is therefore delimited in a radially inward direction via the relief groove and in the radially outer direction via the edge. When the second abutment surface is formed circumferentially, the relief groove is then also formed circumferentially.

According to one example design option of the invention, the flange is provided radially inward of the second abutment surface with a contact surface, which faces axially in the direction of the slide-on side and serves as the surface against which the gear wheel to be attached rests. Advantageously, the flange therefore also acts according to the definition of an axial end position of the gear wheel on the differential cage, which gear wheel is to be attached.

In one example development of the invention, the differential cage has a transversely extending receiving bore, which is provided for receiving a bearing pin for the at least one differential gear. The receiving bore extends transversely to a rotation axis of the differential cage and can be formed as a through-hole.

Example aspects of the invention also relate to a differential which has a differential cage according to one or more of the above-described example variants. The differential cage is welded to a gear wheel which is, in particular, a ring gear. The welding is carried out at a weld which is formed on one of the two abutment surfaces of the differential cage. The differential is in the form, in particular, of a bevel gear differential. Alternatively, the differential can also be a spur gear differential, a planetary differential, etc.

BRIEF DESCRIPTION OF THE DRAWINGS

An advantageous example embodiment of the invention, which is explained in the following, is shown in the drawings, in which.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
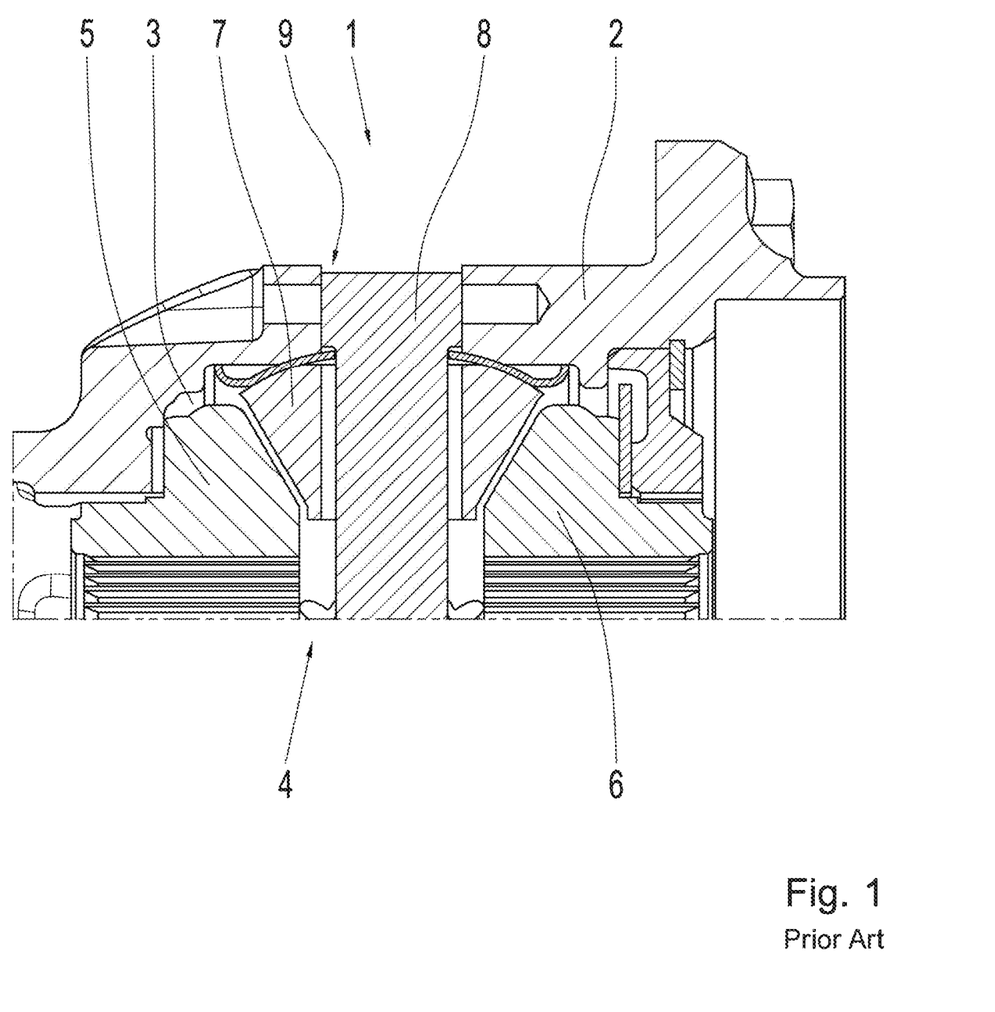
FIG. 1 shows a sectional view of one part of a differential which is per se known.

FIG. 1 shows a sectional view of one part of a differential 1 which belongs to the prior art. This differential 1 is in the form of a bevel gear differential. The differential 1 has a differential cage 2 which accommodates a differential gear set 4 of the differential 1 in an interior space 3.

The differential gear set 4 has two output bevel gears 5 and 6 and multiple differential gears 7, which are in the form of bevel gears and are each rotatably mounted on a bearing pin 8. The individual differential gear 7 is meshed both with the output bevel gear 5 and with the output bevel gear 6. The bearing pin 8 is accommodated in the differential cage 2 in a transversely extending receiving bore 9 such that the differential gears 7 are therefore rotatably mountedly located in the differential cage 2. In a manner known, in principle, to a person skilled in the art, an input torque introduced via the differential cage 2 is transmitted onto the bearing pin 8 and thus converted into a revolution of the differential gears 7, which carry along the two output bevel gears 5 and 6 due to the tooth engagement and split the introduced input torque uniformly onto the output bevel gears 5 and 6. Due to rotational motions on the bearing pin 8, the differential gears 7 can additionally allow for speed differentials between the output bevel gears 5 and 6.

In order to introduce the input torque, a gear wheel (not shown in greater detail in FIG. 1), which can be in the form of a ring gear, is attached on the differential cage 2. It is known to a person skilled in the art that the attachment of the gear wheel to the differential cage 2 can be achieved, apart from bolt connections, also via a weld connection.

Figure 2:
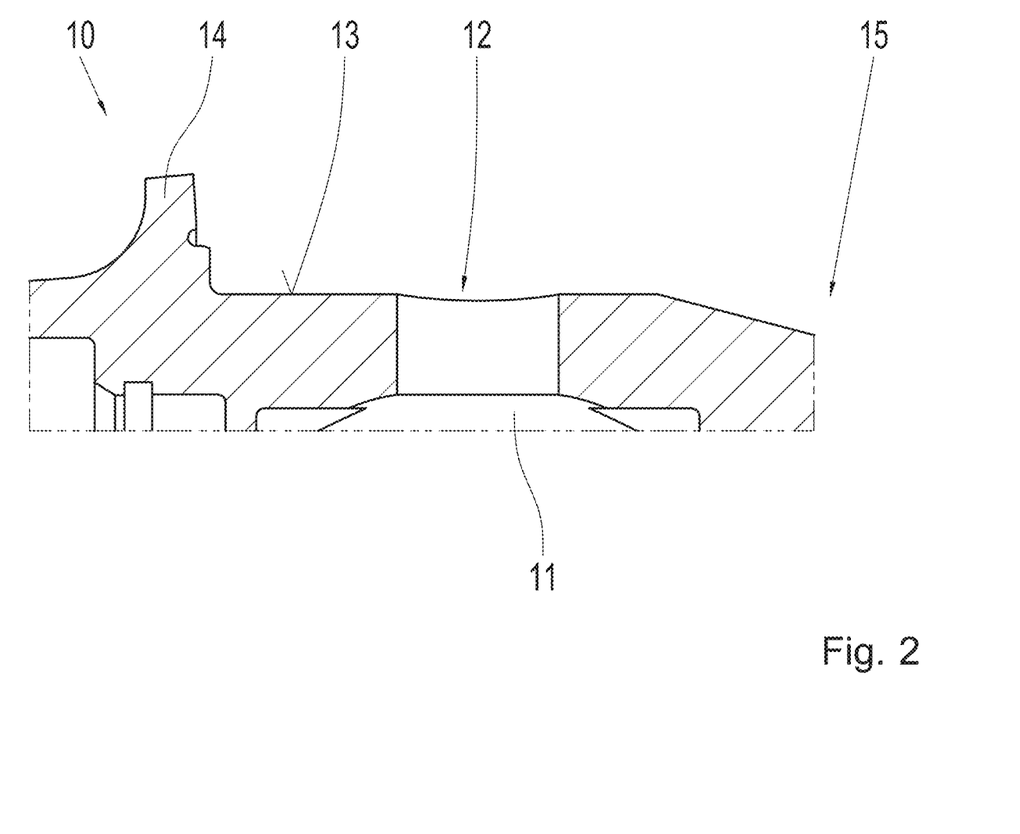
FIG. 2 shows a sectional view of a region of a differential cage according to a preferred example embodiment of the invention.

FIG. 2 shows a sectional view of a differential cage 10, which is designed according to a preferred example embodiment of the invention and can be used instead of the differential cage 2 in the differential 1 from FIG. 1. The differential cage 10 also defines an interior space 11 for accommodating a differential gear set and is transversely penetrated by a receiving bore 12, which is provided for accommodating a bearing pin for at least one differential gear.

The differential cage 10 is provided on the radially outward side with a circumferential lateral surface 13 and a circumferential flange 14. The lateral surface 13 serves as the surface against which a gear wheel rests, which gear wheel is to be attached on the differential cage 10 and, for this purpose, is slid onto the differential cage 10 from a slide-on side 15. The flange 14 is formed axially on a side of the lateral surface 13 remote from the slide-on side 15 and projects in a radially outward direction relative to the remaining portion of the differential cage 10.

Figure 3:
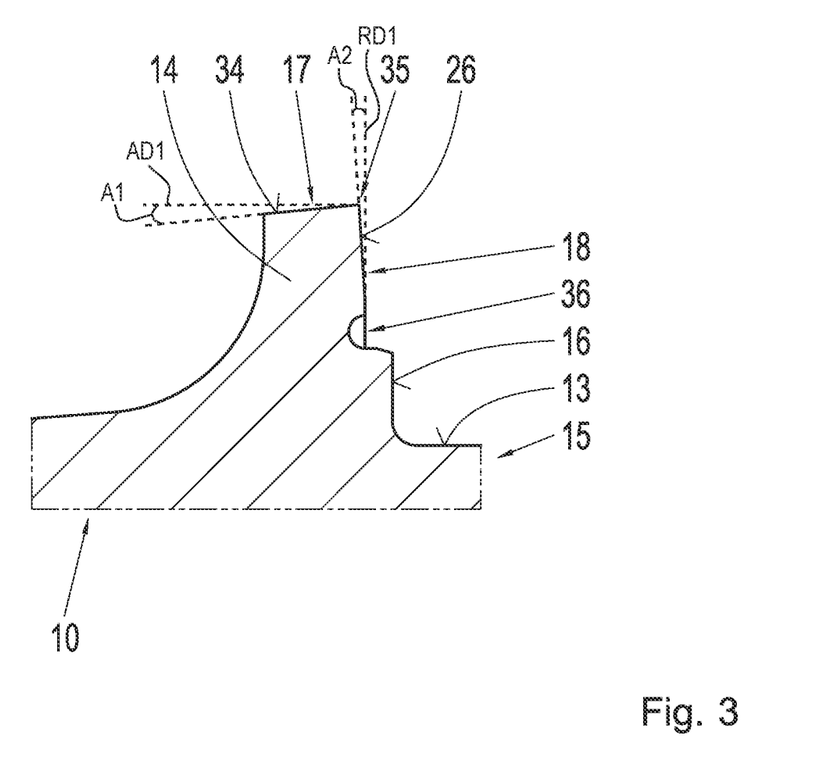
FIG. 3 shows a detail of the differential cage from FIG. 2.

The flange 14 is shown in greater detail in FIG. 3. It is apparent that the flange 14 defines a circumferential contact surface 16 adjacent to the lateral surface 13. This contact surface 16 forms a stop for the gear wheel, which is to be slid onto the differential cage 10 and attached thereon, in that the gear wheel, when slid on, comes to rest against the contact surface 16, whereby an axial end position of the gear wheel on the differential cage 10 is defined.

Furthermore, two abutment surfaces 17 and 18 are formed on the flange 14, of which the abutment surface 17 is provided on the flange 14 facing radially outwards, while the abutment surface 18 faces axially in the direction of the slide-on side 15. As a distinguishing feature, these two abutment surfaces 17 and 18 are provided as alternative attachment regions in order to be able to attach different variants of gear wheels on the differential cage 10. Specifically, the abutment surfaces 17 and 18 are designed to each form a weld joint of a weld connection with the gear wheel to be attached.

Figure 4:
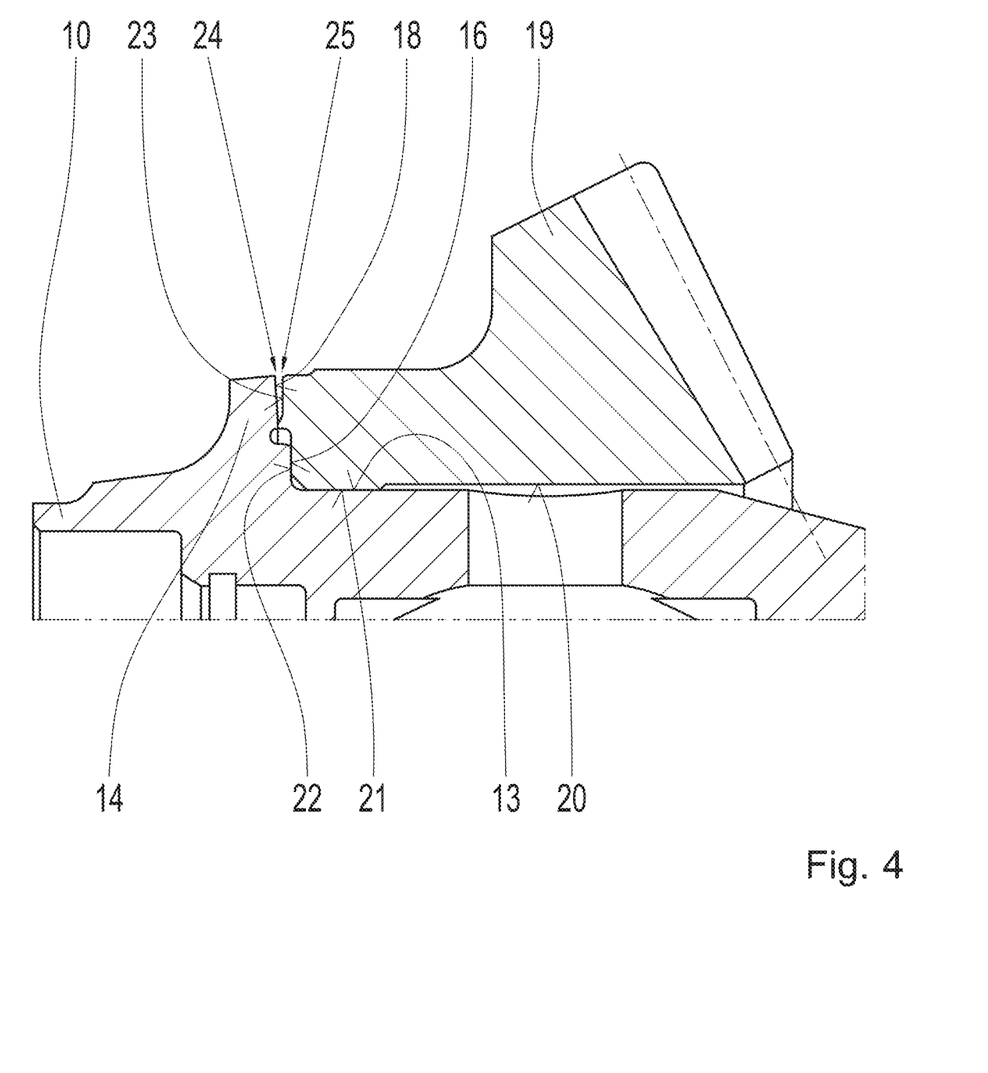
FIG. 4 shows a sectional view of the differential cage from FIG. 2 with a first gear wheel attached thereto.

In FIG. 4, this is shown for the attachment of a gear wheel 19, which is a ring gear. This gear wheel 19 is slid by a through-hole 20 onto the differential cage 10. The gear wheel 19 rests against a guide surface 21 on the lateral surface 13 of the differential cage 10 and, in addition, rests via an end face 22 against the contact surface 16 of the flange 14. The abutment surface 18 of the flange 14 and an abutment surface 23 of the gear wheel 19 positioned axially opposite the abutment surface 18 form an axial weld joint 24, by which a welding groove 25 is defined. This welding groove 25 is configured such that, in order to weld the gear wheel 19 to the differential cage 10, a weld can be introduced, which is configured as a combined single-V butt weld with broad root face/single-U butt weld. The axial welding is carried out, in particular, by laser welding.

In order to obtain this configuration of the weld, a groove face 26 is formed on the abutment surface 18, which groove face 26 is in the form of a bevel and faces radially outwards. The groove face 26 extends over the entire abutment surface 18 in order to obtain a surface formation of the abutment surface 18 for implementing a half single-V butt weld with broad root face. A bevel angle A2 (FIG. 3) of the groove face 26 preferably lies in the range from five degrees (5°) to fifteen degrees (15°) relative to a radial direction RD1 (FIG. 3).

Figure 5:
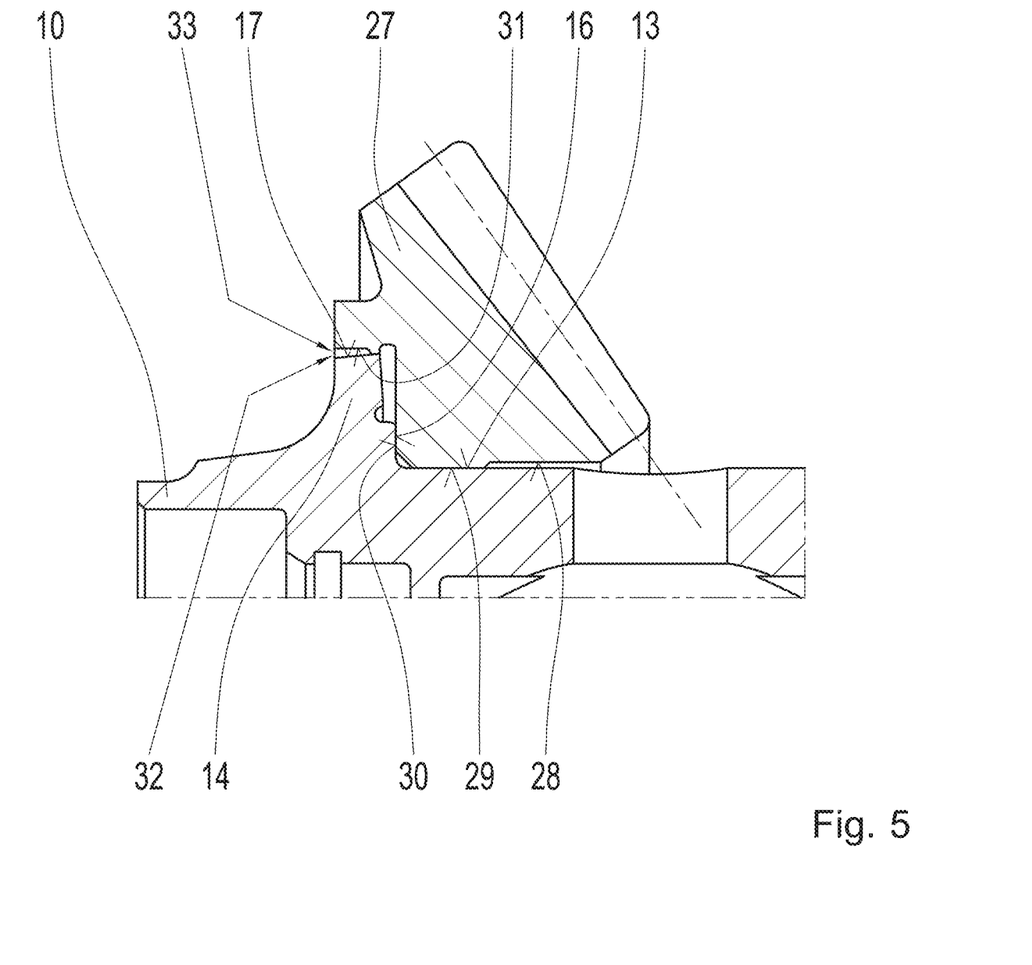
FIG. 5 shows a sectional view of the differential cage from FIG. 2 with a second gear wheel attached thereto.

FIG. 5 shows a view of the differential cage 10 with a gear wheel 27 attached thereon, which gear wheel is also in the form of a ring gear but is configured differently from the gear wheel 19 shown in FIG. 4, in order to achieve a transmission ratio which, in an input-side connection of the differential cage 10, deviates in comparison to the gear wheel 19. The gear wheel 27 is also slid by a through-hole 28 onto the differential cage 10 and rests against a guide surface 29 on the lateral surface 13 of the differential cage 10. An axial end position of the gear wheel 27 on the differential cage 10 is predefined by contact of the gear wheel 27 at an end face 30 with the contact surface 16 of the flange 14. In the axial end position, the abutment surface 17 of the flange 14 and an abutment surface 31, which is formed on the gear wheel 27 and is positioned radially opposite the abutment surface 17 in the axial end position, form a radial weld joint 32. By this weld joint 32, a welding groove 33 lying radially between the flange 14 and the gear wheel 27 is defined. The welding groove 33 is used for introducing a weld in the form of a combined single-V butt weld with broad root face/single-U butt weld. This radial welding is also carried out, in particular, by laser welding.

As is apparent, in particular, in FIG. 3, a surface formation of the welding groove 33 on the part of the flange 14 is defined due to the fact that a groove face 34 is also formed on the abutment surface 17. This groove face 34 is also in the form of a bevel, which faces axially in an opposite direction to the slide-on side 15. The groove face 34 extends over the entire abutment surface 17, as a result of which, on the part of the abutment surface 17 a surface formation for implementing a half single-V butt weld with broad root face is obtained. A bevel angle A1 of the groove face 34 preferably lies in the range from five degrees (5°) to fifteen degrees (15°) relative to an axial direction AD1.

In the flange 14, the abutment surfaces 17 and 18 are adjacent to each other, the abutment surfaces 17 and 18 being separated from each other by a circumferential edge 35. In a radially inward direction, the abutment surface 18 is delimited by a circumferential relief groove 36 and separated from the contact surface 16.

By the example embodiment according to the invention, a differential cage can be provided, which is universally suitable to be welded to different types of gear wheels.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 differential
2 differential cage
3 interior space
4 differential gear set
5 output bevel gear
6 output bevel gear
7 differential gears
8 bearing pin
9 receiving bore
10 differential cage
11 interior space
12 receiving bore
13 lateral surface
14 flange
15 slide-on side
16 contact surface
17 abutment surface
18 abutment surface
19 gear wheel
20 through-hole
21 guide surface
22 end face
23 abutment surface
24 weld joint
25 welding groove
26 groove face
27 gear wheel
28 through-hole
29 guide surface
30 end face
31 abutment surface
32 weld joint
33 welding groove
34 groove face
35 edge
36 relief groove

The invention claimed is:

1. A differential cage (10) for accommodating at least one differential gear (7) of a differential gear set (4) of a differential (1), comprising
   a lateral surface (13) on a radially outward side, a gear wheel (19; 27) of the differential (1) being positionable on the lateral surface (13), the gear wheel (19; 27) being slidable onto the lateral surface (13) from a slide-on side (15) and attachable to the differential cage (10); and
   a radially outwardly projecting flange (14) located axially on a side of the lateral surface (13) remote from the slide-on side (15),
   wherein a first abutment surface (17) and a second abutment surface (18) are formed on the radially outwardly projecting flange (14), the first and the second abutment surfaces being configured as alternatives for forming a weld joint (24; 32) with the gear wheel (19; 27) when the gear wheel (19; 27) is attached on the differential cage (10),
   wherein the first abutment surface (17) is formed on the radially outwardly projecting flange (14) such that the first abutment surface (17) faces radially outwardly, a first welding groove face (34) being formed on the first abutment surface (17), the first welding groove face (34) facing axially in an opposite direction to the slide-on side (15), and
   wherein the second abutment surface (18) is formed on the radially outwardly projecting flange (14) such that the second abutment surface (18) faces axially towards the slide-on side (15), a second welding groove face (26) being formed on the second abutment surface (18), the second welding groove face (26) facing radially outwardly.

2. The differential cage (10) of claim 1, wherein the first welding groove face (34) of the first abutment surface (17) comprises a bevel or a rounding.

3. The differential cage (10) of claim 1, wherein the second welding groove face (26) of the second abutment surface (18) comprises a bevel or a rounding.

4. The differential cage (10) of claim 1, wherein the first abutment surface (17) and the second abutment surface (18) on the radially outwardly projecting flange (14) are separated by an edge (35).

5. The differential cage (10) of claim 1, wherein the second abutment surface (18) is delimited in a radially inward direction by a relief groove (36).

6. The differential cage (10) of claim 1, wherein the radially outwardly projecting flange (14) includes a contact surface (16) is disposed radially inward of the second abutment surface (18), the contact surface (16) facing axially towards the slide-on side (15), the contact surface (16) being configured for the gear wheel (19; 27) to rest against when the gear wheel (19; 27) is attached on the differential cage (10).

7. The differential cage (10) of claim 6, wherein the contact surface (16) is axially closer to the slide-on side (15) than the second abutment surface (18).

8. The differential cage (10) of claim 1, wherein the differential cage (10) defines a transversely extending receiving bore (12) configured for receiving a bearing pin (8) for the at least one differential gear (7).

9. A bevel gear differential, comprising a gear wheel and the differential cage of claim 1, wherein the differential cage is welded to the gear wheel such that a weld is formed on one of the first and second abutment surfaces of the differential cage, and the gear wheel comprises a ring gear.

10. The differential cage (10) of claim 1, wherein a single unitary part of the differential cage (10) forms both and the radially outwardly projecting flange (14).

11. The differential cage (10) of claim 1, wherein the first welding groove face (34) extends at a first angle (A1) relative to an axial direction (AD1), the first angle being in a range from five degrees (5°) to fifteen degrees (15°).

12. The differential cage (10) of claim 1, wherein the second welding groove face (34) extends at a second angle (A2) relative to a radial direction (RD1), the second angle being in a range from five degrees (5°) to fifteen degrees (15°).

* * * * *